US006879544B1

(12) United States Patent
Sermarini

(10) Patent No.: US 6,879,544 B1
(45) Date of Patent: Apr. 12, 2005

(54) MANATEE VOCALIZATION DETECTION METHOD AND SYSTEM

(75) Inventor: Christopher A. Sermarini, Panama City, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/699,441

(22) Filed: Oct. 31, 2003

(51) Int. Cl.[7] ................................................ H04B 1/02
(52) U.S. Cl. ....................................................... 367/136
(58) Field of Search ................................ 367/136, 131, 367/139

(56) References Cited

U.S. PATENT DOCUMENTS

| 4,231,103 A | * | 10/1980 | Timm ........................ 708/404 |
| 2003/0222778 A1 | * | 12/2003 | Piesinger .................... 340/541 |
| 2004/0076080 A1 | * | 4/2004 | Niezrecki et al. ........... 367/139 |

OTHER PUBLICATIONS

Nair et al., "Studies on the Vocalizations of the Sea Cow Dugong Dugon in Captivity," Indian Journal of Fisheries 22:277–278, Aug. 1977.*

* cited by examiner

Primary Examiner—Daniel Pihulic
(74) Attorney, Agent, or Firm—James T. Shepherd

(57) ABSTRACT

Manatee vocalizations are detected by performing a variety of frequency domain processing operations on sound signals detected in an underwater region. Overlapping time windowed portions of digitized sound data are converted to the frequency domain where power spectrums therefor are estimated. Each such power spectrum is then normalized with each resulting normalized spectrum value indicative of broadband noise having a value that is less than a normalized spectrum value indicative of narrowband tones. Normalized spectrum values indicative of narrowband tones that occur (i) in windows of frequency bins encompassing frequencies lower and higher than each of a lowest resonant frequency (associated with manatee vocalizations) and its harmonics and (ii) with a specified degree of variance with respect to frequency separation therebetween, are filtered out. Remaining normalized spectrum values indicative of narrowband tones are assigned to a frequency based harmonic set. A scoring routine is applied that uses the normalized spectrum values in each harmonic set. A manatee vocalization is indicated when a threshold score is achieved across at least a portion of the overlapping time-windowed portions.

15 Claims, 2 Drawing Sheets

MANATEE VOCALIZATION DETECTION METHOD AND SYSTEM

ORIGIN OF THE INVENTION

The invention described herein was made in the performance of official duties by an employee of the Department of the Navy and may be manufactured, used, licensed by or for the Government for any governmental purpose without payment of any royalties thereon.

FIELD OF THE INVENTION

The invention relates generally to detection of underwater sounds, and more particularly to a method and system for detecting manatee vocalizations in the water.

BACKGROUND OF THE INVENTION

The West Indian manatee is a large, plant-eating aquatic mammal that congregates for much of the year in shallow coastal areas and warm water canals. Unfortunately, these are also the locations traversed by many recreational and commercial vessels. As a result, the manatee is being injured and killed by collisions with vessel hulls and propellers.

In an effort to reduce such collisions, a variety of solutions have been proposed and/or tried. The solutions include regulating vessel speeds in areas frequented by manatees, performing aerial surveillance during specified times (e.g., boat races, times of high boat traffic, during times of high performance boat/motor testing, etc.), instituting a moratoria on permits for marinas and other facilitates in areas frequented by manatees, and various forms of manatee detection schemes such as use of volunteer "spotters", signals between boaters and acoustic detection. Obviously, a robust mechanized method of manatee detection is the preferred approach. However, the high noise environment of shallow coastal waters has, thus far, led to acoustic detection schemes having high false alarm rates. Detection schemes with high false alarm rates lead to unnecessary boat maneuvering and, over time, a loss of user confidence in the detection scheme.

SUMMARY OF THE INVENTION

Accordingly, it is an object of the present invention to provide a method and system for detecting the presence of manatees in a water environment.

Another object of the present invention is to provide a method and system for detecting the presence of manatees in high-noise shallow-water environment.

Other objects and advantages of the present invention will become more obvious hereinafter in the specification and drawings.

In accordance with the present invention, the detection of manatee vocalizations begins with the detection of sounds in an underwater region. After a digital representation of the sounds is generated, sounds at unwanted frequencies are filtered out resulting in the generation of filtered data in a frequency range of interest. A plurality of overlapping time-windowed portions of the filtered data are then formed. For each time-windowed portion, a power spectrum for frequency bins in the frequency range of interest is estimated. Each such power spectrum is then normalized using an average of power spectrums calculated over a plurality of the frequency bins. As a result, a normalized spectrum value is defined for each frequency bin with each normalized spectrum value associated with broadband noise having a value that is less than that associated with narrowband tones. Next, for each of the overlapping time-windowed portions, normalized spectrum values indicative of narrowband tones that occur (i) in windows of frequency bins encompassing frequencies lower and higher than each of a lowest resonant frequency (associated with manatee vocalizations) and its harmonics and (ii) with a specified degree of variance with respect to frequency separation therebetween, are filtered out. As a result of this filtering step, a resulting number of normalized spectrum values indicative of narrowband tones are maintained. Each normalized spectrum value that is not filtered out is assigned to a frequency based harmonic set. A scoring routine is applied that uses the normalized spectrum value in each harmonic set. A manatee vocalization is indicated when a threshold score is achieved across at least a portion of the overlapping time-windowed portions.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
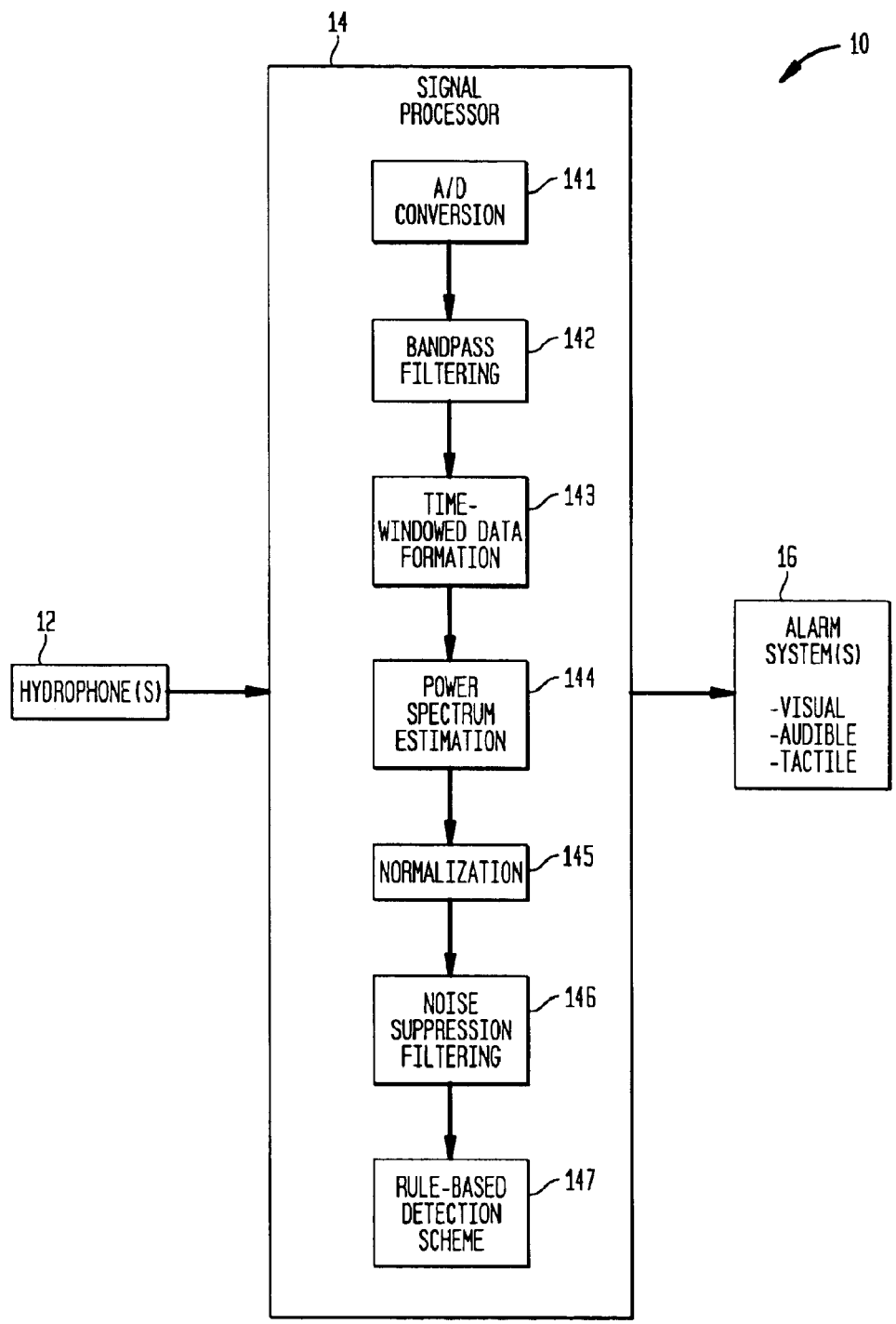
FIG. 1 is a block diagram of a system used for the detection of manatee vocalizations in accordance with the present invention.

Referring now to the drawings, and more particularly to FIG. 1, a system for detecting manatee vocalizations in accordance with the present invention is shown and is referenced generally by numeral 10. In general, system 10 includes one or more hydrophone(s) 12 placed in an underwater region of interest, e.g., in the vicinity of a marina, in a shipping channel, on the hull or just below a surface vessel, on or towed behind a submerged vessel, etc. The analog output of hydrophone(s) 12 is supplied to a local or remotely-located signal processor 14 which performs a number of signal processing operations thereon. Signal processor 14 supplies an output when manatees are detected to one or more alarm system(s) 16 to generate one or more of a visual, audible and tactile type of alarms The particular hardware used to construct system 10 can be selected from a wide variety of components as would be well understood by one of ordinary skill in the art. Accordingly, the particular hardware used to implement the present invention is not a limitation thereof.

Signal processor 14 encompasses a number of processing operations which can be achieved by one or several processing components. Accordingly, it is to be understood that the separate blocks shown in the drawings are solely for purpose of facilitating an explanation of the present invention. The analog output from hydrophone(s) 12 is first converted into a digital signal representation thereof at analog-to-digital (A/D) conversion block 141. The digital signals are then passed through a passband filtering block 142 so that only the broad frequency range associated with manatee vocalizations. Typically, this frequency range is approximately 1600 Hz to 18 KHz.

The digitized, bandpass filtered data is then split into overlapping time-windowed data blocks at time windowed data formation block 143. Each data block has a time duration less than or equal to that of a typical manatee vocalization or approximately 0.175 seconds or less. A power spectrum estimation block 144 processes each time-windowed data block to, in general, provide an estimate of the power spectrum thereof in the frequency domain. Each power spectrum value associated with each frequency bin is then normalized at block 145. The output sequence generated by normalization results in values having a mean of 1.0 when broadband noise is the input and a larger mean when the input is a narrowband tonal signal. A noise suppression filtering block 146 evaluates the narrowband tonal signals as a function of their frequency bins and operates to suppress those signals that are from closely-spaced frequency bins. Finally, the remaining narrowband tonal signals are scored at a rule-based detection scheme block 147. Each time the rule based scheme is satisfied over a number of overlapping time-windowed data blocks, one or more of alarm system(s) 16 are activated.

Figure 2:
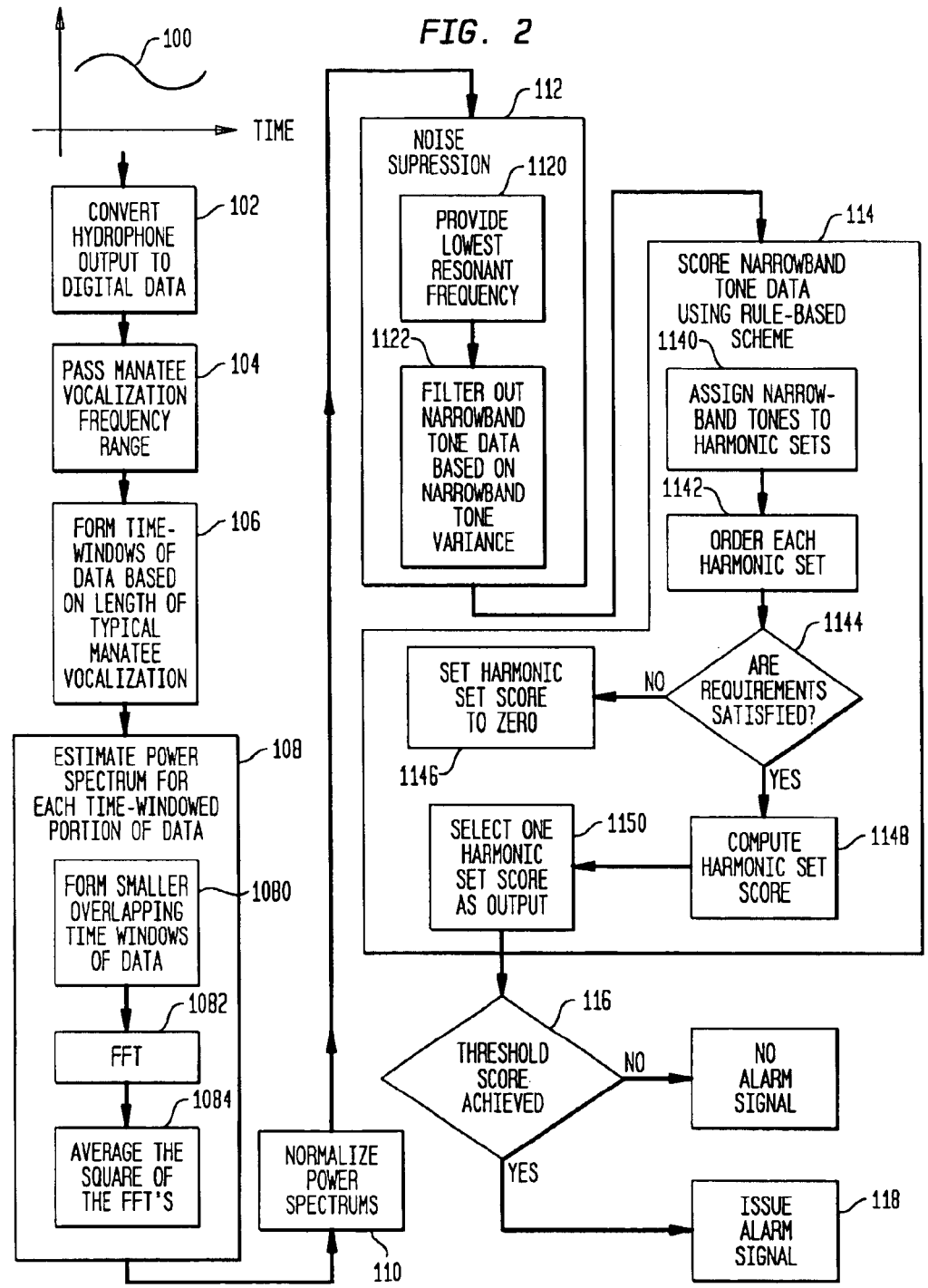
FIG. 2 is a top-level flow diagram of a method used to detect manatee vocalizations in accordance with an embodiment of the present invention.

Referring now additionally to FIG. 2, one embodiment of the method of the present invention will be explained in greater detail. An analog output 100 from hydrophone(s) 12 is converted to digital data at step 102. The digital data is bandpass filtered at step 104 to filter out all frequencies other than those in the range of typical manatee vocalizations which typically ranges between 1600 Hz and 18 KHz. The resulting digital data is then split into overlapping time-windowed data blocks at step 106. The time or length of each time window of data is selected to be less than or equal to that of a typical manatee vocalization or less than or equal to 0.175 seconds. The amount of overlap is selected to assure the capture near the start of a manatee vocalization and is typically on the order of 75% of the window length.

The time-windowed, bandpass filtered digital blocks of data are processed in four stages broadly illustrated by steps 108, 110, 112 and 114. Note that the second and third stages may be performed in an iterative fashion.

The first stage (step 108) involves power spectrum estimation of each time-windowed portion of the data received from step 106. A variety of power spectrum estimation techniques can be used without departing from the scope of the present invention. By way of illustrative example, the well-known periodogram technique is applied in the illustrated embodiment. Briefly, as is known in the art, each time-windowed portion of the data is split into smaller overlapping time-windowed blocks at step 1080. Next, step 1082 performs a Fast Fourier Transform (FFT) on each of the smaller windows of data to convert same into the frequency domain. Finally, at step 1084, an estimation of the power spectrum as a function of frequency bins is formed by taking the average of the squares of the FFTs.

The second stage (step 110) of processing in the present invention involves normalizing each power spectrum in an effort to suppress broadband noise while maintaining narrowband tones indicative of typical manatee vocalizations. This second stage also suppresses the effects of changes in broadband ambient noise conditions while maintaining the narrowband structure of manatee vocalizations.

Once again, a variety of normalization schemes can be used without departing from the present invention. By way of 1.0 whereas the presence of a narrowband tone in a frequency bin results in a normalized value that is (generally significantly) greater than 1.0.

The third stage (step 112) of processing involves the application of a noise suppression technique that evaluates the spacing between frequency bins containing narrowband tones. The goal of noise suppression is to maintain narrowband tones indicative of manatee vocalizations while suppressing narrowband tones indicative of noise and broadband noise not removed by the normalization process. Typical manatee vocalizations have a lowest resonant frequency (at which their amplitude is high) and successive resonant frequencies (at which amplitude eventually falls off). Accordingly, when narrowband tones are indicated by the results of step 110, the frequency at which the narrowband tones occur is evaluated in terms of resonant frequencies of interest in an effort to reduce false alarms.

More specifically, step 1120 provides (i.e., user selected/provided) one or more lowest resonant frequencies of interest depending on the background noise characteristics, type of manatee, age of manatee, sex of manatee, etc., that is of particular interest. Next, at step 1122, closely-spaced narrowband tones occurring in windows of frequency bins that are above and below each of the lowest resonant frequency and its harmonics are filtered/suppressed. As used herein, the phrase "closely-spaced narrowband tones" refers to a high degree of variance in the occurrence of narrowband tones within the above-noted windows of frequency bins. For example, if a lowest resonant frequency of 1600 Hz was provided at step 1120 (with harmonics at 3200 Hz, 4800 Hz, etc.), the closeness or variance with respect to the occurrence of narrowband tones occurring in windows of frequency bins that encompass frequencies that are lower and higher than (but not including) each of 1600 Hz, 3200 Hz, 4800 Hz, etc., is evaluated. A high degree of variance within these windows results in suppression of such narrowband tones. The size of the windows (of frequency bins) and the level of acceptable or unacceptable variance are predetermined by the user. In step 1122, filtering or suppression can be accomplished by resetting the normalized power spectrum value at that frequency bin to a value of 1.0.

The fourth and final stage (step 114) of processing involves scoring the narrowband tone data. Prior to applying the scoring routine, step 1140 assigns each remaining frequency bin having a normalized power spectrum value indicative of a narrowband tone to a harmonic set based upon the frequency of the frequency bin. Each harmonic set is defined by a base frequency and resonance thereof. Next, step 1142 orders the normalized values for each harmonic set based on the magnitude thereof, i.e., largest to smallest. Next, at step 1144, two requirements are checked for each harmonic set's base frequency. By way of example, the first requirement is that either (i) two or more significant harmonics of the harmonic set's base frequency exist (e.g., the values at the harmonics are indicative of the spectrum level for the narrowband tone) or (ii) the value of the largest harmonic minus one is less than or equal to a percentage (e.g., 5%) of the second largest harmonic component minus one. The second requirement is that the resonant frequencies associated with the largest and second largest ordered values (i.e., output from step 1142) correspond to two of the four lowest resonant frequencies of a harmonic set.

If either of these requirements is not satisfied, the harmonic set is assigned a score of zero at step 1146. If the requirements are satisfied for a harmonic set, then the harmonic set has a score computed at step 1148. Such scoring could generate an average value that is computed over the harmonic set's resonances. Note that such averaging could limit participation in the average to those frequencies having (normalized power spectrum) values that are within some percentage of the highest value for the harmonic set. With each harmonic set having a score (i.e., either assigned at step 1146 or computed at step 1148), step 1150 selects one harmonic set based on its score as an output. For example, the harmonic set achieving the highest score could be selected. The above-described scoring stage (step 114) is performed for each of the overlapping time-windowed portions of data. If, at step 116, a threshold score is achieved across one or more time-windowed portions of the data thereby indicating the presence of a manatee, an alarm signal is issued at step 118. As described above, the alarm can be visual, audible and/or tactile in nature.

The advantages of the present invention are numerous. Manatee vocalizations are autonomously detected in a way that significantly reduces false alarms. Accordingly, "manatee alarms" generated by the present invention will have a high degree of confidence associated therewith.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A method of detecting manatee vocalizations, comprising the steps of:

detecting sounds in an underwater region;
   generating a digital representation of said sounds;
   filtering out sounds at unwanted frequencies from said digital representation, wherein filtered data in a frequency range of interest is maintained;
   forming a plurality of overlapping time-windowed portions of said filtered data;
   estimating, for each of said plurality of overlapping time-windowed portions, a power spectrum for frequency bins in said frequency range of interest;
   normalizing, for each of said plurality of overlapping time-windowed portions, each said power spectrum for each of said frequency bins thereof using an average of power spectrums calculated over a plurality of said frequency bins, wherein a normalized spectrum value is defined for each of said frequency bins and wherein each said normalized spectrum value associated with broadband noise has a value that is less than each said normalized spectrum value associated with narrowband tones;
   providing a lowest resonant frequency of interest associated with manatee vocalizations, wherein said lowest resonant frequency has harmonics associated therewith;
   filtering out, for each of said plurality of overlapping time-windowed portions, normalized spectrum values indicative of narrowband tones that occur (i) in windows of frequency bins encompassing frequencies lower and higher than each of said lowest resonant frequency and said harmonics thereof and (ii) with a specified degree of variance with respect to frequency separation therebetween, wherein a resulting number of said normalized spectrum values indicative of narrowband tones are maintained;
   assigning, for each of said plurality of overlapping time-windowed portions, each said normalized spectrum value from said resulting number thereof to a frequency-based harmonic set, each of which is defined by a base frequency and resonances thereof; and
   applying, for each of said plurality of overlapping time-windowed portions, a scoring routine that uses each said normalized spectrum value in each said harmonic set wherein a manatee vocalization is indicated when a threshold score is achieved across at least a portion of said plurality of overlapping time-windowed portions.

2. A method according to claim 1 wherein said step of estimating comprises the step of performing a periodogram on each of said plurality of overlapping time-windowed portions.

3. A method according to claim 1 wherein said average of power spectrums used in said step of normalizing is based on frequency bins that are less than said frequency bin of said power spectrum being normalized if a first quantity is greater than a second quantity, said first quantity defined by said power spectrum being normalized minus an average of power spectrums based on frequency bins that are less than said frequency bin of said power spectrum being normalized, and said second quantity defined by said power spectrum being normalized minus an average of power spectrums based on frequency bins that are greater than said frequency bin of said power spectrum being normalized.

4. A method according to claim 3 wherein said average of power spectrums used in said step of normalizing is based on frequency bins that are greater than said frequency bin of said power spectrum being normalized if said first quantity is not greater than said second quantity.

5. A method according to claim 1 wherein said scoring routine comprises the steps of:

evaluating each said harmonic set in accordance with a set of rules;
   assigning a score of zero to each said harmonic set not satisfying said set of rules; and
   forming a score for each said harmonic set satisfying said set of rules, said score being determined using said value for each said normalized spectrum in each said harmonic set satisfying said set of rules.

6. A method according to claim 1 further comprising the step of displaying a visible indicator each time said threshold score is achieved across said portion of said plurality of overlapping time-windowed portions.

7. A method according to claim 1 further comprising the step of producing an audible indicator each time said threshold score is achieved across said portion of said plurality of overlapping time-windowed portions.

8. A method according to claim 1 further comprising the step of producing a tactile indicator each time said threshold score is achieved across said portion of said plurality of overlapping time-windowed portions.

9. A system for detecting manatee vocalizations comprises:

means for detecting sounds in an underwater region;
   means for generating a digital representation of said sounds;
   means for filtering out sounds at unwanted frequencies from said digital representation, wherein filtered data in a frequency range of interest is maintained;
   means for forming a plurality of overlapping time windowed portions of said filtered data;
   means for estimating, for each of said plurality of overlapping time-windowed portions, a power spectrum for frequency bins in said frequency range of interest;
   means for normalizing, for each of said plurality of overlapping time-windowed portions, each said power spectrum for each of said frequency bins thereof using an average of power spectrums calculated over a plurality of said frequency bins, wherein a normalized spectrum value is defined for each of said frequency bins and wherein each said normalized spectrum value associated with broadband noise has a value that is less than each said normalized spectrum value associated with narrowband tones;

means for filtering out, for each of said plurality of overlapping time-windowed portions, normalized spectrum values indicative of narrowband tones that occur (i) in windows of frequency bins encompassing frequencies lower and higher than each of a lowest resonant frequency of interest associated with manatee vocalizations and harmonics thereof and (ii) with a specified degree of variance with respect to frequency separation therebetween, wherein a resulting number of said normalized spectrum values indicative of narrowband tones are maintained;

means for assigning, for each of said plurality of overlapping time-windowed portions, each said normalized spectrum value from said resulting number thereof to a frequency-based harmonic set defined by a base frequency and resonances thereof; and means for applying, for each of said plurality of overlapping time-windowed portions, a scoring routine that uses each said normalized spectrum value in each said harmonic set wherein a manatee vocalization is indicated when a threshold score is achieved across at least a portion of said plurality of overlapping time-windowed portions.

10. A system as in claim 9 wherein said means for detecting sounds in an underwater region comprises at least one hydrophone.

11. A system as in claim 9 wherein said means for generating a digital representation of said sounds comprises an analog-to-digital converter.

12. A system as in claim 9 wherein said means for filtering out sounds at unwanted frequencies from said digital representation comprises a bandpass filter.

13. A system as in claim 9 further comprising a display coupled to said means for applying for displaying a visible indicator each time said threshold score is achieved across said portion of said plurality of overlapping time-windowed portions.

14. A system as in claim 9 further comprising a sound reproduction device coupled to said means for applying for producing an audible indicator each time said threshold score is achieved across said portion of said plurality of overlapping time-windowed portions.

15. A system as in claim 9 further comprising a device coupled to said means for applying for producing a tactile indication each time said threshold score is achieved across said portion of said plurality of overlapping time-windowed portions.

* * * * *